(12) United States Patent
Aggarwal et al.

(10) Patent No.: US 9,007,999 B2
(45) Date of Patent: Apr. 14, 2015

(54) SYSTEM AND METHOD FOR MAC DESIGN OF A FULL-DUPLEX CENTRALIZED CELLULAR NETWORK

(71) Applicant: AT&T Intellectual Property I, L.P., Atlanta, GA (US)

(72) Inventors: Vaneet Aggarwal, Parsippany, NJ (US); Dinesh Bharadia, Stanford, CA (US); Rittwik Jana, Parsippany, NJ (US); Nemmara K. Shankaranarayanan, Bridgewater, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 106 days.

(21) Appl. No.: 13/720,032

(22) Filed: Dec. 19, 2012

(65) Prior Publication Data
US 2014/0169232 A1    Jun. 19, 2014

(51) Int. Cl.
*H04W 4/00* (2009.01)
*H04L 5/14* (2006.01)

(52) U.S. Cl.
CPC ...................................... *H04L 5/14* (2013.01)

(58) Field of Classification Search
USPC ................... 370/328–339, 252–253, 430–480
See application file for complete search history.

(56) References Cited

U.S. PATENT DOCUMENTS

| 8,036,600 | B2 * | 10/2011 | Garrett et al. | ................ | 455/41.2 |
| 2004/0253962 | A1 * | 12/2004 | Ganti et al. | ................ | 455/452.1 |
| 2011/0211615 | A1 * | 9/2011 | Hamamura | .................... | 375/130 |

* cited by examiner

*Primary Examiner* — Iqbal Zaidi

(57) ABSTRACT

Systems, methods, and computer-readable storage media for scheduling full-duplex communications between half-duplex mobile devices and a full-duplex capable access point. The system receives, within a time window, tones from a plurality of mobile devices, the tones indicating that each device in the plurality of devices are performing one of uploading data and downloading data. The system pairs the plurality of devices into pairs of an uploading device and a downloading device, where the pairing is based on an interference each device in the plurality of devices causes with remaining devices in the plurality of devices, to yield a list of paired devices. Upon communicating the list of paired devices to the plurality of devices, one device of each pair transmits data to the base station in a frequency channel while the other device receives data from the base station in the same frequency.

17 Claims, 7 Drawing Sheets

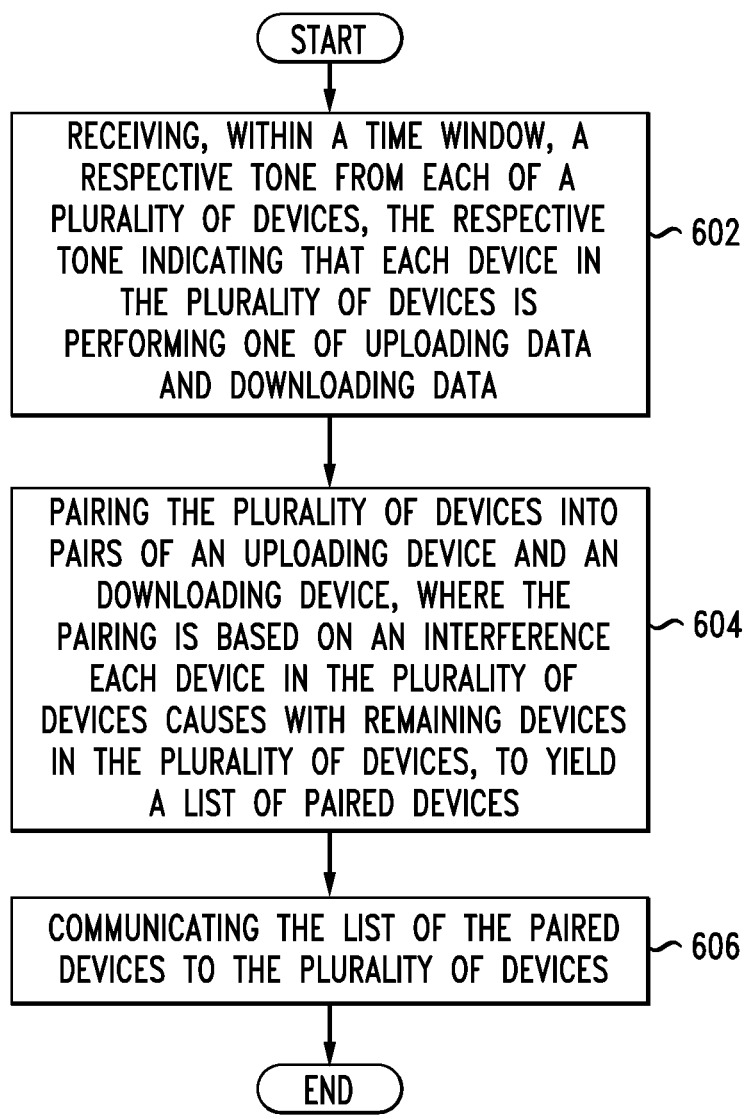

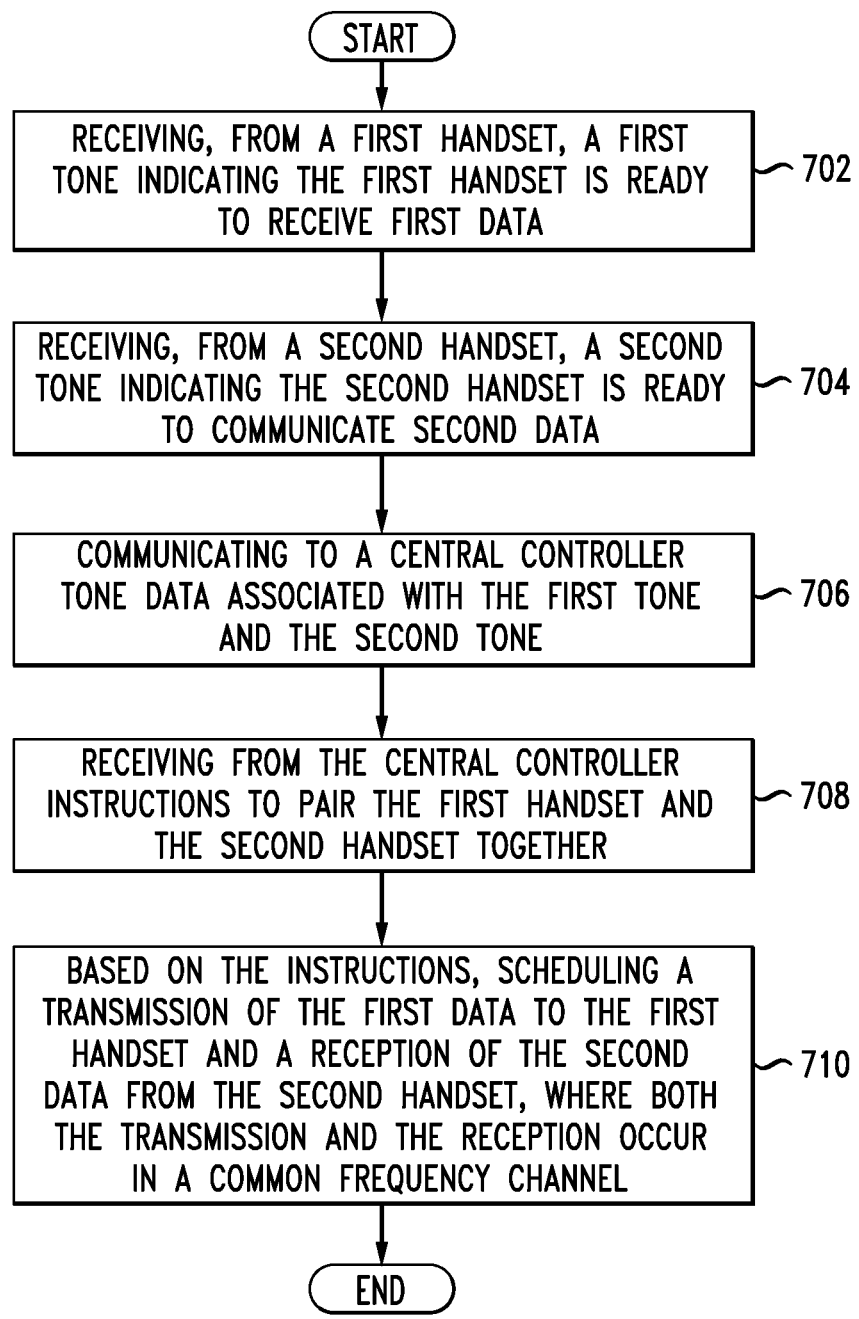

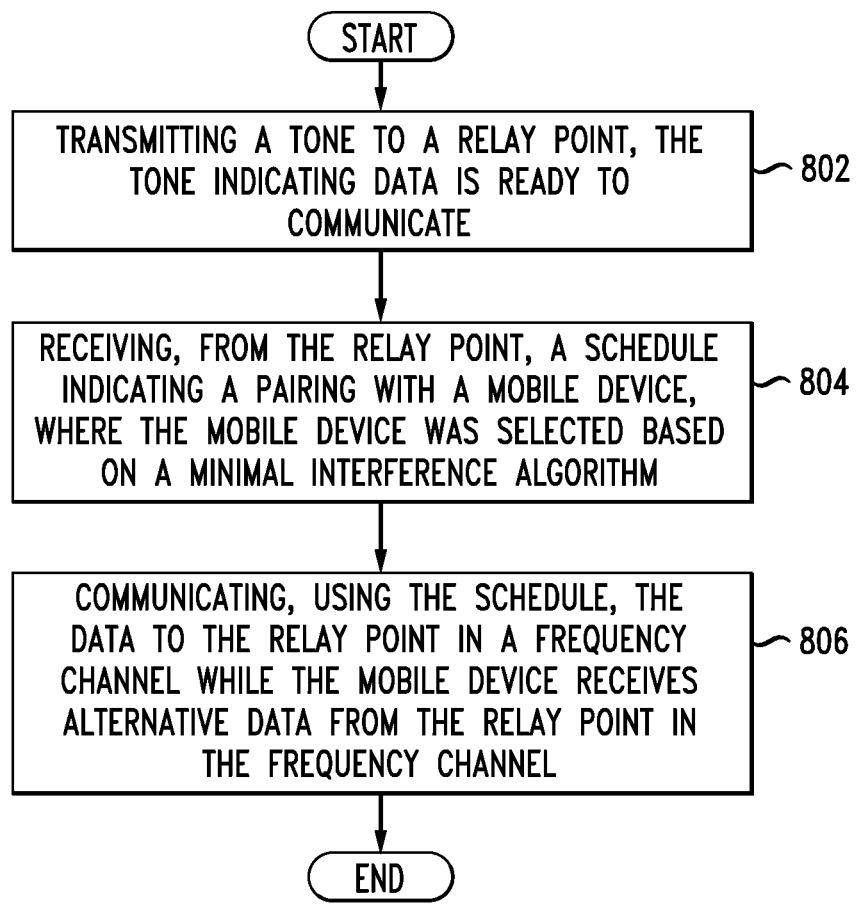

SYSTEM AND METHOD FOR MAC DESIGN OF A FULL-DUPLEX CENTRALIZED CELLULAR NETWORK

BACKGROUND

1. Technical Field

The present disclosure relates to full-duplex communication and more specifically to coordination of full-duplex communications between cellular devices by receiving tones from each device, performing an analysis to determine the relative interference each device would cause the other devices, pairing the devices, and initiating full-duplex communication.

2. Introduction

Cellular devices transmit and receive data from base stations. Such base stations act as Access Points to wider networks of communication, which can then transmit and receive data to and from any cellular device. Full-duplex communications allow both transmission and reception of data in a single frequency channel by reducing the self-interference of a transmitting device. However, at present, most cellular devices operate exclusively using half-duplex communications, where the device can either transmit or receive data in a frequency channel at any given moment. Because cellular devices are typically not full-duplex capable, the bandwidth offered by full-duplex communications is being wasted.

BRIEF DESCRIPTION OF THE DRAWINGS

FIG. 6 illustrates a first example method embodiment;

FIG. 7 illustrates a second example method embodiment; and

FIG. 8 illustrates a third example method embodiment.

DETAILED DESCRIPTION

Figure 1:
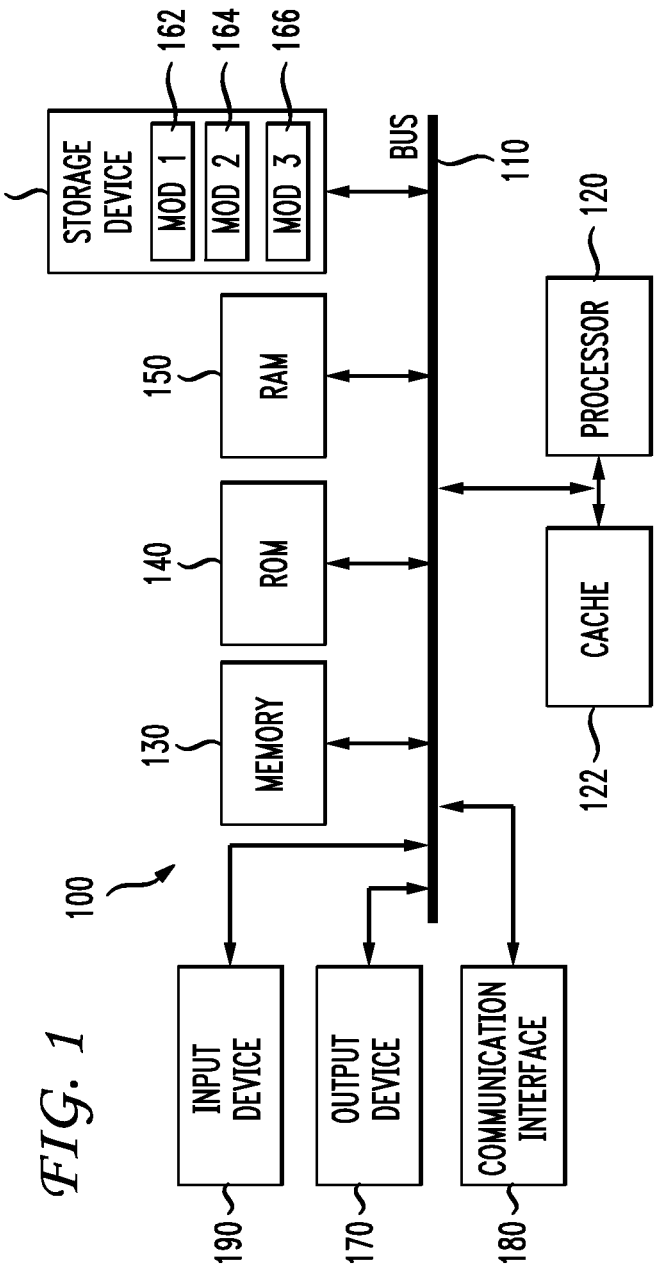
FIG. 1 illustrates an example system embodiment.

A system, method and computer-readable media are disclosed. A system embodiment determines pairs of cellular devices that one communicating with a base station, where the communications occur simultaneously in a single frequency channel. The system configured according to the disclosure selects pairs of cellular devices for full-duplex communication with the base station based on which cellular devices will produce the lowest amount of interference when the devices are transmitting and/or receiving in a single frequency channel.

Consider the following example. A base station, or Access Point, configured to perform full-duplex communications cannot communicate efficiently because many of the cellular devices which interact with the base station are neither configured nor capable of full-duplex communication. Instead of being full-duplex capable, the cellular devices are only half-duplex capable. Such devices can only transmit or receive (not both) at any given time. To take advantage of the full-duplex capability of the base station, the base station receives a tone from each cellular device indicating a power level of each respective device. In addition, each cellular device receives the tones of the other cellular devices, determines which other cellular devices would cause too much interference, and transmits the list of interfering devices to the base station. Using the power levels of each respective device coupled with the lists of interfering devices each device determined, the base station pairs the devices based on the amount of interference each device will produce in the other devices. Upon pairing the devices, the base station then transmits data to one half-duplex cellular device while receiving data from a second half-duplex cellular device, where both the transmission and reception of data occur in a single frequency channel. The transmitting half-duplex device does not cause errors in the receiving half-duplex device because the base station paired the devices such that the amount of interference the transmitting device causes in the receiving device is below a threshold. In the above-described configuration, the base station operates in full duplex mode by transmitting data to a first half-duplex device while receiving data on the same frequency at the same time from a second half-duplex device.

In circumstances where there are multiple pairs of half-duplex devices communicating with the base station, each pair would have a specific frequency channel assigned to them for respective communications. In circumstances with multiple base stations clustered together within a given area, a central controller can connect to each of the base stations, linking the base stations together to coordinate interference conflicts. The central controller then receives information about the devices within the cluster from the base stations in the cluster and performs the interference analysis. Based on that interference analysis, the central controller provides device pairing assignments to the base stations, which then communicate with the respective devices. The pairing assignments can act as a schedule, coordinating communications by frequency channel and/or time.

Pairing communications assignments for communicating devices allow for improved communication efficiency for full-duplex communications by reducing the amount of interference a transmitting device or base station has with a receiving device or base station. The improvement can be found both in circumstances where only a single base station is within a communication range with multiple devices and/or in circumstances where a cluster of base stations are within a communication range of multiple devices.

The central controller, or a single base station, performs an analysis to determine which half-duplex devices are most likely to cause interference with one another should they be transmitting and receiving with a base station in the same frequency channel. To acquire the data necessary for the analysis, the devices which are communicating first transmit a tone, or short data pulse, to the base station and the other devices. The tone indicates that the device is ready to either transmit or receive data, and can optionally include additional data. Examples of additional data which can be included, or attached to, the tone include latitude and longitude data, a vector, speed data, estimated remaining frames, and data regarding whether the device is about to enter space associated with another tower. In other circumstances, data can be calculated and determined at the base station and/or at the central controller. As an example, if the tone communicated optional data associated with a Global Positioning System (GPS), over time the system could determine a pattern and extrapolate future locations, when the device will be switching towers, etc. As the base station/central controller pairs the device with other devices, such additional or optional information can be used to select a device with an acceptable level of interference based on the extrapolated information.

When the base station receives the tone, the base station records the information associated with the tone. As an example, the base station makes a record of the tones received, the record having a list of identifiers associated with each device, a power level of each device based on the power level of the tone received, and any additional data associated with that device. Additional data in the record can include data transmitted with, or alongside, the tone. Other additional data in the record can include the duration of the current use of the device, when the central controller believes the use will end, prediction of frame lengths, formatting data, time until tower change, estimated/predicted interference with other devices, other towers with which the device can communicate, etc.

Clustered based towers can share the data they record about each device by transmitting that data to a central controller. The central controller can be connected to the base towers in the cluster of base towers by wires (including standard copper, fiber-optic cable, or other tangible wires), or wirelessly, depending on specific configurations. Upon receiving the data, the central controller (or a base station, if not clustered) determines how much interference each device would cause the other devices using the recorded information. At a basic level, the analysis can use the power levels of the tones received to determine which devices produce interference with one another should they both communicate with a base station simultaneously. At more complex levels, the analysis can use, in addition to the power level, the other data in the record to determine which devices are more likely to interfere with one another during transmission/reception of data in a single frequency channel. In addition, the central controller can use yet further additional data which may or may not be included in the data communicated by the base stations. For example, the central controller may have access to geographic data, including maps of geographic features or maps of relative electromagnetic attenuation. The central controller may combine the GPS coordinates of individual devices with the maps during the analysis. Consider, for example, a circumstance where the central controller determines that a large mountain or particular buildings will block interference between two devices. Based on the analysis, the central controller may determine that the devices make for a more efficient pair.

Having performed the analysis, the central controller sends pairing assignments to the base stations. In a situation involving only a single base station and multiple half-duplex devices ready to transmit or receive data, the assignments pair a half-duplex device having first data ready to transmit to the base station with a half-duplex device ready to receive second data from the base station. In certain situations, the first data could be the second data, however in most situations that will not be the case. Based on the pairing assignment received, the base station receives the first data from the transmitting half-duplex device while transmitting the second data to the receiving half-duplex device, where the first data and the second data are both transmitted in a single frequency channel or spectrum. Appropriate instructions are provided to the devices to establish the right frequencies and time slot or other protocol assignments to achieve the full duplex communication at the base station. The half-duplex device receiving the second data from the base station will receive the first data from the transmitting half-duplex data; however, the transmission attenuates the first data to the point where it will not interfere with the second data from the base station. The attenuation of the signal from the other device, and subsequent lack of interference generated, is one purpose of the pairing assignments.

After transmitting a certain number of frames, or after a certain amount of time, the base station receives new tones from the devices which are ready to communicate with the base station. Receiving the new tones initiates a new phase interference measurement. The base station updates the previous tone data, or alternatively makes a new table of tone data, and transmits that data to a central controller. The central controller analyses the data with data from other base station and makes frequency pairing assignments (in a scheduling phase) where at least one goal of the central controller is eliminating or reducing significant inter-device interference when the paired devices are communicating in a single frequency channel. The process of receiving interference measurements and scheduling using the measurements continues, in full or in part, while devices have data to either transmit or receive.

The configuration and embodiments disclosed herein can modify the Medium Access Control (MAC) for base stations communicating with user devices. The modification changes the MAC from being half-duplex specific to being capable of both half-duplex and full-duplex communications. Implementation of the disclosed, modified, MAC can occur on top of any existing MAC for half-duplex systems. For example, consider a time-division duplex (TDD) system where all base stations are either transmitting simultaneously or all receiving simultaneously, all in the same frequency block. The legacy half-duplex MAC scheduler might use an assignment scheme such as a proportional fairness scheme to determine when each base station communications with the user devices. Implementation of the modified MAC can occur on top of the legacy half-duplex MAC scheduler, or in other configurations, can replace the legacy half-duplex MAC scheduler.

Various embodiments are described in detail below. While specific implementations are described, it should be understood that this is done for illustration purposes only. Other components and configurations may be used without parting from the spirit and scope of the disclosure.

The present disclosure addresses a MAC design for a full-duplex centralized cellular system. A system, method and computer-readable media are disclosed which schedules a downlink user in a cellular network with an uplink user, where both the downlink user and the uplink user are communicating in the same time and frequency block. A brief introductory description of a basic general purpose system or computing device in FIG. 1 which can be employed to practice the concepts is disclosed herein. A more detailed description of full-duplex centralized cellular systems, with accompanying variations, will then follow. These variations shall be described herein as the various embodiments are set forth. The disclosure now turns to FIG. 1.

With reference to FIG. 1, an exemplary system and/or computing device 100 includes a processing unit (CPU or processor) 120 and a system bus 110 that couples various system components including the system memory 130 such as read only memory (ROM) 140 and random access memory (RAM) 150 to the processor 120. The system 100 can include a cache 122 of high speed memory connected directly with, in close proximity to, or integrated as part of the processor 120. The system 100 copies data from the memory 130 and/or the storage device 160 to the cache 122 for quick access by the processor 120. In this way, the cache provides a performance boost that avoids processor 120 delays while waiting for data. These and other modules can control or be configured to control the processor 120 to perform various actions. Other system memory 130 may be available for use as well. The memory 130 can include multiple different types of memory with different performance characteristics. It can be appreciated that the disclosure may operate on a computing device 100 with more than one processor 120 or on a group or cluster of computing devices networked together to provide greater processing capability. The processor 120 can include any general purpose processor and a hardware module or software module, such as module 1 162, module 2 164, and module 3 166 stored in storage device 160, configured to control the processor 120 as well as a special-purpose processor where software instructions are incorporated into the processor. The processor 120 may be a self-contained computing system, containing multiple cores or processors, a bus, memory controller, cache, etc. A multi-core processor may be symmetric or asymmetric.

The system bus 110 may be any of several types of bus structures including a memory bus or memory controller, a peripheral bus, and a local bus using any of a variety of bus architectures. A basic input/output (BIOS) stored in ROM 140 or the like, may provide the basic routine that helps to transfer information between elements within the computing device 100, such as during start-up. The computing device 100 further includes storage devices 160 such as a hard disk drive, a magnetic disk drive, an optical disk drive, tape drive or the like. The storage device 160 can include software modules 162, 164, 166 for controlling the processor 120. The system 100 can include other hardware or software modules. The storage device 160 is connected to the system bus 110 by a drive interface. The drives and the associated computer-readable storage media provide nonvolatile storage of computer-readable instructions, data structures, program modules and other data for the computing device 100. In one aspect, a hardware module that performs a particular function includes the software component stored in a tangible computer-readable storage medium in connection with the necessary hardware components, such as the processor 120, bus 110, display 170, and so forth, to carry out a particular function. In another aspect, the system can use a processor and computer-readable storage medium to store instructions which, when executed by the processor, cause the processor to perform a method or other specific actions. The basic components and appropriate variations can be modified depending on the type of device, such as whether the device 100 is a small, handheld computing device, a desktop computer, or a computer server.

Although the exemplary embodiment(s) described herein employs the hard disk 160, other types of computer-readable media which can store data that are accessible by a computer, such as magnetic cassettes, flash memory cards, digital versatile disks, cartridges, random access memories (RAMs) 150, read only memory (ROM) 140, a cable or wireless signal containing a bit stream and the like, may also be used in the exemplary operating environment. Tangible computer-readable storage media expressly exclude media such as energy, carrier signals, electromagnetic waves, and signals per se.

To enable user interaction with the computing device 100, an input device 190 represents any number of input mechanisms, such as a microphone for speech, a touch-sensitive screen for gesture or graphical input, keyboard, mouse, motion input, speech and so forth. An output device 170 can also be one or more of a number of output mechanisms known to those of skill in the art. In some instances, multimodal systems enable a user to provide multiple types of input to communicate with the computing device 100. The communications interface 180 generally governs and manages the user input and system output. There is no restriction on operating on any particular hardware arrangement and therefore the basic hardware depicted may easily be substituted for improved hardware or firmware arrangements as they are developed.

For clarity of explanation, the illustrative system embodiment is presented as including individual functional blocks including functional blocks labeled as a "processor" or processor 120. The functions these blocks represent may be provided through the use of either shared or dedicated hardware, including, but not limited to, hardware capable of executing software and hardware, such as a processor 120, that is purpose-built to operate as an equivalent to software executing on a general purpose processor. For example the functions of one or more processors presented in FIG. 1 may be provided by a single shared processor or multiple processors. (Use of the term "processor" should not be construed to refer exclusively to hardware capable of executing software.) Illustrative embodiments may include microprocessor and/or digital signal processor (DSP) hardware, read-only memory (ROM) 140 for storing software performing the operations described below, and random access memory (RAM) 150 for storing results. Very large scale integration (VLSI) hardware embodiments, as well as custom VLSI circuitry in combination with a general purpose DSP circuit, may also be provided.

The logical operations of the various embodiments are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits. The system 100 shown in FIG. 1 can practice all or part of the recited methods, can be a part of the recited systems, and/or can operate according to instructions in the recited tangible computer-readable storage media. Such logical operations can be implemented as modules configured to control the processor 120 to perform particular functions according to the programming of the module. For example, FIG. 1 illustrates three modules Mod1 162, Mod2 164 and Mod3 166 which are modules configured to control the processor 120. These modules may be stored on the storage device 160 and loaded into RAM 150 or memory 130 at runtime or may be stored in other computer-readable memory locations.

Figure 2:
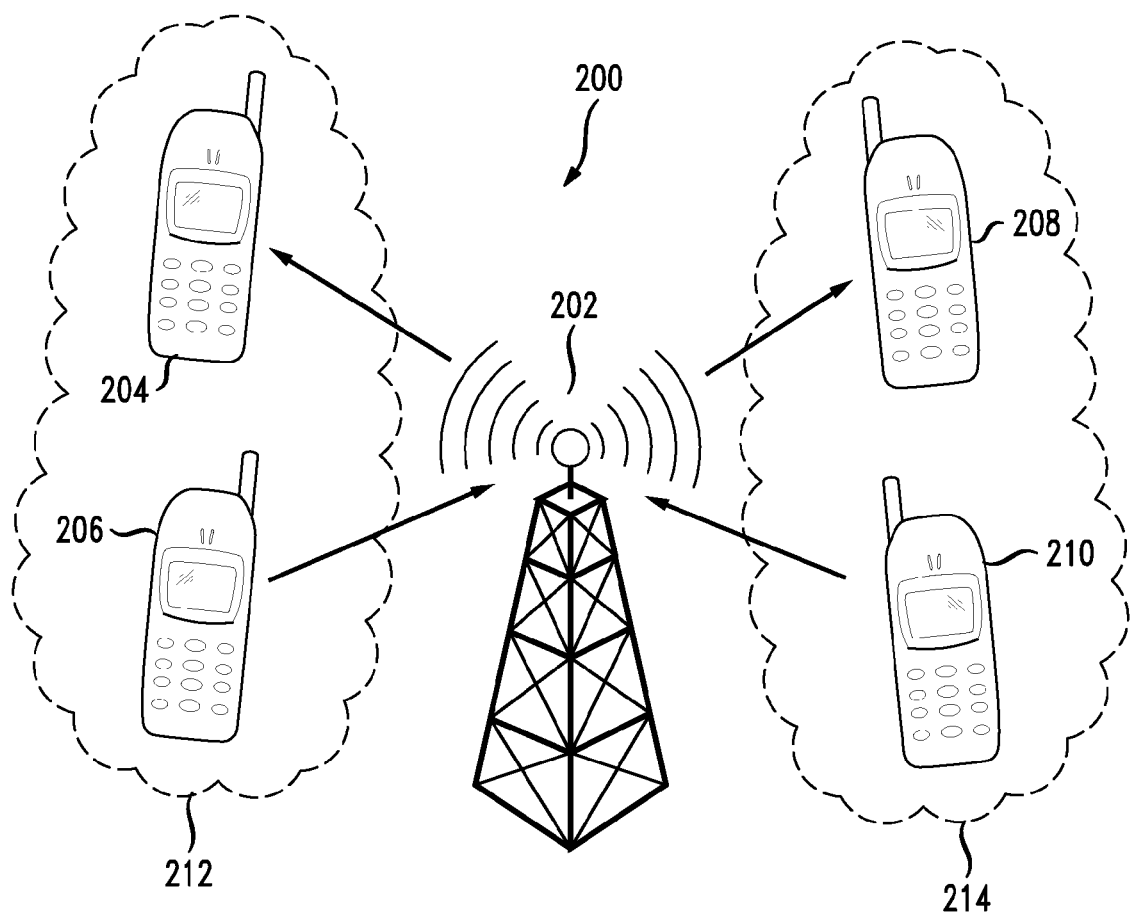
FIG. 2 illustrates an example of device pairing at a single base station.

Having disclosed some components of a computing system, the disclosure now turns to FIG. 2, which illustrates an example 200 of device pairing 212, 214 at a single base station 202. In example 200, the base station 202 is the only base station within a communication range. In other examples, the base station 202 can be part of a cluster, or connected to a central controller which coordinates transmission and receiving assignments at each base station. The mobile devices 204, 206, 208, 210 in example 200 are configured for half-duplex communications, and the base station 202 is configured for full-duplex communications by cancelling self-interference from its own transmissions. If the base station 202 were part of a cluster of base stations, the base station 202 could similarly cancel out interference from the other base stations.

To initiate the interference measurement phase, the mobile devices 204, 206, 208, 210 transmit tones to the base station 202 indicating that they have either data to transmit to the base tower 202 (devices 206, 210) or that they are ready to receive data from the base tower 202 (devices 204, 208). The tones in example 200 are Orthogonal Frequency-Division Multiplexing (OFDM) tones, but the concepts apply to any unique frequency/time resource. In one configuration, the base station 202 maintains a list of active users/devices engaged in communication, as opposed to all devices in range which would include idle devices. In other configurations, the base station 202 can maintain a list of all devices, active or idle. Control signaling during a control period can maintain the list of active devices. It is assumed that every active user/device is assigned a unique frequency tone which they use for participating in the interference measurement phase. Base stations make assignments from pre-allocated groups of tones, and the pre-allocation ensures that users in neighboring base stations have mutually unique tones. Other base stations can reuse the tone groups when the other base station is a sufficient distance (i.e., a threshold distance) from the base station 202. If the base station 202 is sufficiently isolated, all of the pre-allocated groups of tones may be available to the base station. If there are more active devices than available tones, the base station can require the devices to transmit tones in specified rounds, then select a subset of available tones for measurements in each specified round. If there are fewer users than available tones, base stations operating in a cluster of base stations can lend subsets of the available tones to other base stations which may be in need of available tones.

One way to accurately estimate the relative interference between each device is to fix the power level of each tone transmitted by the user devices. Each user device then transmits its assigned tone, with the base station 202 and the other nearby user devices receiving the tone. Because the power level of each tone is equal upon transmission, the base station 202 will have a received power level for each device, and each device will have similarly received a tone from all of the other active devices. Each device then creates a list of tone numbers where the received power was higher than a pre-specified threshold. The lists of tone numbers indicate the tone numbers which can potentially cause interference with a particular device. Each user device then transmits the list for the particular device to the base station, ending the interference measurement phase.

The base station 202 receives the lists of interfering signals, stores any additional data associated with the tones, and performs an analysis on the tones and data, thus initiating the scheduling phase. If the base station 202 is part of a cluster of base stations, a central controller can similarly perform the analysis. In example 200, the base station 202 performs the analysis. The base station 202 can use several algorithms to decide which users 204, 206, 208, 210 will be transmitting (uplink) and which will be receiving (downlink) in each timeslot. One approach is to build on a half-duplex scheduler, where during the downlink portion of a time-division duplex (TDD) scheme, the scheduler selects all users who are going to be receiving in a particular time slot by using a proportional fairness scheme to ensure fairness. After selecting the receiving (downlink) users for each slot, other users which cause the least (or an acceptable amount) of interference to the downlink recipients can be assigned to transmit on the same frequencies in an uplink capacity at the same time. Another approach is to perform a joint optimization over all possible uplink/downlink pairs, then choose a set that increases the sum throughput, while monitoring the past transmissions for fairness.

As shown in FIG. 2, the base station 202 performing the analysis in example 200 has determined that devices 204 and 206 should form a pair 212, while devices 208 and 210 should form a second pair 214. Device 206 uses a first frequency channel to transmit data to the base station 202, while the base station 202 uses the same first frequency channel to transmit additional data to device 204. Similarly, device 210 to transmits data to the base station 202 using a second frequency channel, while the base station 202 uses that same second frequency channel to transmit additional data to device 208. The base station 202 can perform both sets of communications simultaneously. That is, the base station 202 can communicate (transmit and receive, simultaneously) with both pairs 212, 214 at the same time. In other configurations, the base station 202 communicates with each pair in turn using a single frequency channel for each full-duplex communication with the half-duplex capable devices.

Figures 3, 4:
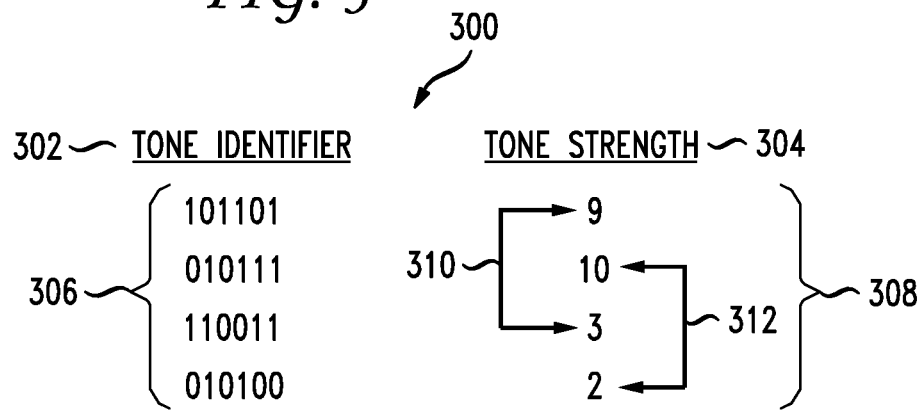
FIG. 3 illustrates an exemplary list of tone power levels.
FIG. 4 illustrates an exemplary list of tone power levels and additional data.

FIG. 3 illustrates an exemplary list 300 of tone power levels. A user device or a base station creates the list during the interference measurement phase. As the base station receives tones, the base station records each tone using its associated tone identifier 302. Tone identifiers can be assigned based on an availability of associated tones, or can be assigned permanently to the user device transmitting the associated tone. However, each user device and/or base station will have a list of tone identifiers 302 corresponding to the user devices 306 which are transmitting tones. As the base station receives the tones, the tone strength 304 of each user device is also recorded 308.

If the list 300 of FIG. 3 corresponds to a list generated on a user device, then such devices have a tone strength of "9" and "10" could be above a threshold, whereas the devices having a tone strength of "2" and "3" could be below the threshold. Therefore, the user device could communicate to a base station that device "101101" and "010111" will cause unacceptable interference.

If the list 300 of FIG. 3 corresponds to a list created by a base station, the base station may perform an analysis assigning pairs of user devices 310, 312 based on received power level. The base station can then apply the results directly to current or future communications, or can re-analyze and/or verify the results in light of the lists of incompatible devices produced by user devices.

FIG. 4 illustrates an exemplary list 400 of tone power levels and additional data. Like FIG. 3, FIG. 4 illustrates a table of retained information regarding tone identifiers 402 and tone strength 404. However, the list 400 of FIG. 4 contains additional information regarding location and motion vector 406, as well as the estimated frames remaining 408. In one configuration, the base stations create a list with the additional data, while the user devices only produce lists associated with the power level threshold needed to prevent interference. In another configuration, the individual user devices, the base stations, and the central controller(s) all have the data illustrated in FIG. 4. While the data categories 404, 406, 408 provide exemplary additional data 412 associated with each identifier 410, the categories 404, 406, 408 are not fixed or otherwise exclusive. Examples of other categories can be location relative to a natural geographic feature, battery life remaining on the user device, available full-duplex frequencies, device capabilities and/or frequency capabilities, predicted traffic patterns, and predicted sources of interference beyond the user devices.

The base station, or the central controller performing the analysis, pairs the user devices based on identifiers 410 using the data stored 412 in table. In this example, the system has paired "101101" and "010111" 414, and also paired "110011" with "010100" 416. As an example of the reasoning of the analysis, the system could have determined the pairing because pair 414 has a significant difference in the remaining frames 408, whereas the devices of pair 416 are moving in opposite directions.

Figure 5:
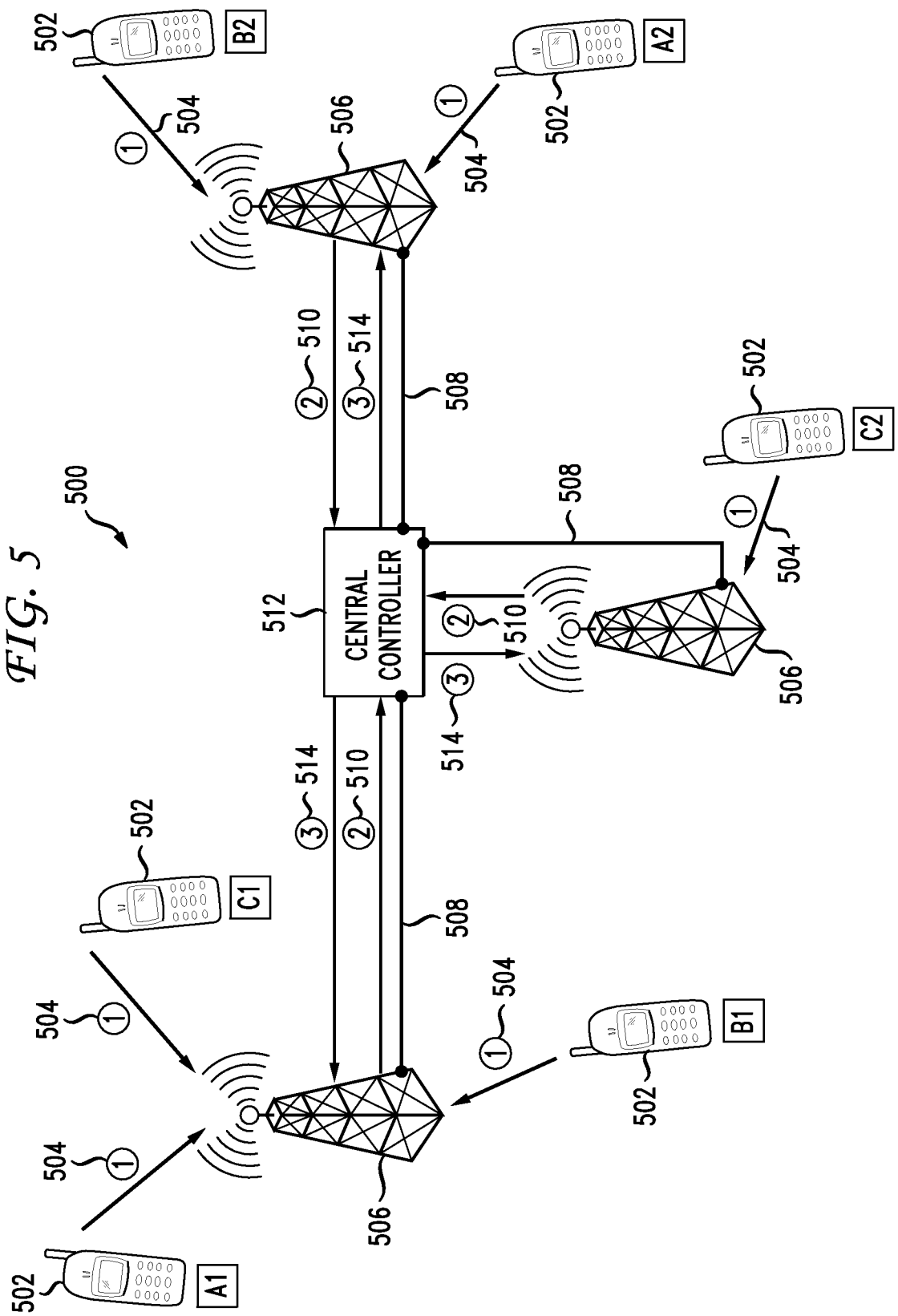
FIG. 5 illustrates an example of multiple devices interacting with a cluster of base stations.

FIG. 5 illustrates an example 500 of multiple devices 502 interacting with a cluster of base stations 506. The cluster of base stations represents base stations within a communication range or distance. As a non-limiting example, base stations can be considered a cluster when the devices interacting with one base station can also interact with a different base station.

Because the device could interact with either base station, the base stations are considered clustered.

Each device 502 first transmits a tone. The base station 506 that the device 502 is communicating with, as well as the remaining user devices 502, receive the tone. The devices 502 record the power levels of the tones received from other devices, creating a list of the devices and associated power levels. When device power levels exceed a threshold, the user device identifies the device as creating too much interference. The devices 502 send the list 504 of interfering devices to the base station 506.

The base stations 506 in turn forward 510 the list of potentially interfering devices to a central controller 512. The central controller 512 receives the lists of interfering nodes and performs an analysis, using the lists and any additional or optional data present, to determine which user devices to pair together. The pairing indicates a best, or relatively lowered amount, of interference during full-duplex communications when one device of each pair transmits in the frequency channel while the other device of the pair receives in the same frequency channel. The central controller measures interference in terms of total throughput of data throughout the entire network, the base stations within a specified radius of the central controller, or the entire cluster of base stations. Alternatively, the interference can be measured using each individual device and ensuring that each device receives the lowest amount of interference possible. In yet another alternative, measured interference can be determined based on the total throughput of a single base station or multiple base stations.

In example 500, the central controller 512 could determine, based on its relative geography, that devices "A1" and "A2" should form a pair, devices "B1" and "B2" should form a pair, and devices "C1" and "C2" should be paired. Alternatively, the central controller 512 could determine that the pairs should be "A1" and "C1", "B1" and "C2", and "B2" and "A2".

The central controller 512, after making the pairing assignments, sends the list of pairing assignments 514 back to the base stations 506. The list of pairing assignments contains identifications of the devices paired together, and can also contain the frequency channel or spectrum assigned to the pair. The list of pairing assignments can further contain information regarding modulation, encoding formats, timing, etc. Should the frequency channel be non-contiguous, the list of pairing assignments can contain a list of the multiple non-contiguous frequency spectrums which form the frequency channel assigned to each pair.

As an alternative configuration to the example just described, the other user devices 502 can ignore the tones initially transmitted by the devices 502 as part of the Interference Measurement phase, meaning the base stations 506 exclusively record the tones. The base stations, or the central controller 512, can then perform an analysis on the tones received, as well as any additional data associated with the tones. Based on the analysis, the central controller 512 pairs the devices 502 (during a scheduling phase) based at least in part on an estimated level of interference each device would receive from the other devices. Other data can be used as well in the analysis. Therefore, in this configuration the individual user devices would not each determine which other devices will produce interference above a certain threshold. Instead, the base stations or central controller will make the determination.

The central controller 512 of FIG. 5 as illustrated connects to each of the base stations 506. The connection 508 can be a fiber optic cable, a copper telephone cable, a coax cable, a CAT-5 cable, or any other tangible means for signal propagation. In addition, the connection 508 can be an air propagated electromagnetic signal, such as a cellular signal, a wireless signal, or other radio signal. The mobile devices 502 are illustrated as cellular phones, however, any form of user device which transmits and receives communications are equally applicable to the disclosed improvements. In particular, devices which are compliant with standards such as the 802.11 IEEE standard.

Having disclosed some basic system components and concepts, the disclosure now turns to the exemplary method embodiments shown in FIGS. 6, 7, and 8. For the sake of clarity, the methods are described in terms of an exemplary system 100 as shown in FIG. 1 configured to practice the method. The steps outlined herein are exemplary and can be implemented in any combination thereof, including combinations that exclude, add, or modify certain steps.

The exemplary method illustrated in FIG. 6 is from the perspective of the central controller 512 illustrated in FIG. 5. The system 100 receives, within a time window, a respective tone from each of a plurality of devices, the respective tone indicating that each device in the plurality of devices is performing one of uploading data and downloading data (602). The plurality of devices can, for example, be mobile devices. When the tone indicates that each device is currently communicating data, the tone further indicates that the device will be communicating additional data at a second time. As an alternative, the respective tone (received at a first time), rather than indicating current performance, can indicate that each device will be uploading or downloading data at a second time which is different than the first time.

The plurality of devices can only be half-duplex capable devices, or can be full-duplex capable operating in a half-duplex mode. The plurality of devices includes at least two devices. The time window can be a fixed time window or can be a dynamic window based on the number of tones received. The system 100 can also receive, in addition to the tones or as an alternative to the tones, additional data associated with the plurality of devices. The alternative data can include lists for each device of the other nearby devices which can produce interference above a threshold in the device, Global Positioning System (GPS) coordinates, movement/vector information, geography relative to the plurality of devices, estimates of frames remaining for each device, and device capabilities. Examples of device capabilities the system 100 can record include half-duplex/full-duplex capabilities, power output, modulation formats, and battery discharge rate. The system 100 can, in addition to receiving the additional data, derive such data using resources stored on the system 100.

The system 100 pairs the plurality of devices into pairs of uploading devices and downloading devices, where the pairing is based on an interference of each device in the plurality of devices causes with remaining devices in the plurality of devices, to yield a list of paired devices (604). The pairing can be further based on the throughput of a network comprising the plurality of devices, and/or further based on reducing the interference experienced between each pair of devices. The list of paired devices can also be a schedule that indicates when each respective pair will transmit/receive, the frequency channel assigned to the pair, and any other information necessary to effectively communicate the signals. The list, or schedule, is received between the first time (when the tones are received) and the second time (when uploading/downloading occurs). The estimated interference each device will have on the remaining devices is based on an analysis of the tones and/or at least some of the additional data the system 100 received. The system 100 then communicates the list of the paired devices to the plurality of devices (606). In various configurations, the communication can be direct from the system 100 to the plurality of devices, whereas in other configurations the communication can be performed by first transmitting the list to base stations or repeater stations, which then forward the list to the plurality of devices.

After the plurality of devices receive the list of paired devices, the plurality of devices upload and download respective data according to the list, where one member of the pair is uploading data in a frequency channel and the other member of the pair is downloading data in the same frequency channel and at the same time. The system 100 can receive notification from the individual devices uploading and downloading data if a device detects too much interference. Using the notification, the system 100 can then modify the pairing assignments in a next scheduling round.

The exemplary method illustrated in FIG. 7 is from the perspective of the base station 506 illustrated in FIG. 5. The system 100 configured to perform the exemplary method receives, from a first handset, a first tone indicating the first handset is ready to receive first data (702). The system 100 further receives, from a second handset, a second tone indicating the second handset is ready to communicate second data (704). The first and second handsets can each be a cellular phone, a computer, a tablet, a smartphone, or any other device which communicates data wirelessly. The first and second tones received can be have a fixed power level when transmitted from the handsets, such that when received by the system 100 the system 100 can calculate the amount of attenuation in each respective tone, and can use the received power level of each tone to determine which handsets will likely cause interference with other handsets. Upon receiving the first tone and the second tone, the system 100 communicates to a central controller tone data associated with the first tone and the second tone (706). Tone data associated with the first tone and the second tone can include the actual tones the system 100 received from the first handset and the second handset, lists of handsets which produce too much interference for the first and/or second handsets, and other associated data or supplemental data determined by the system.

The lists of interfering handsets can be generated by the handsets, or can be generated by the system 100. When the lists of interfering handsets are generated by the first and second handsets, the lists can be communicated to the system 100 as part of, or associated with, the first and second tones. Other exemplary associated data which can be associated with the can include Global Positioning System (GPS) coordinates, movement/vector information, geography relative to the plurality of devices, estimates of frames remaining for each device, and device capabilities of the individual handsets. Examples of device capabilities the system 100 can record include half-duplex/full-duplex capabilities, power output, modulation formats, and battery discharge rate. In certain instances, the system 100 derives the additional information from a combination of the first/second tones and data stored within a database, whereas in other instances the handsets communicate the additional information to the system 100.

The system 100 then receives from the central controller instructions to pair the first handset and the second handset together (708). The instruction can be in the form of a list of pairs of handsets, or can be instructions to determine the pairing assignments of the handsets based on communicated criteria. The pairing assignment can be made with a focus on increasing the total amount of data passing through the system 100 (throughput), can be based on eliminating interference, or can be based on other factors associated with the handsets, network, or other physical limitations. Based on the instructions, the system 100 schedules a transmission of the first data to the first handset and reception of the second data from the second handset, where both the transmission and reception occur in a common frequency channel (710). In such a configuration, the system 100 is operating in full-duplex, sending and receiving data simultaneously in a single frequency channel, while the first handset and the second handset are each operating in half-duplex within the same single frequency channel.

The exemplary method illustrated in FIG. 8 is from the perspective of the device 502 illustrated in FIG. 5. Such devices can be full-duplex or half-duplex capable, however, for purposes of the following method, such devices will be operating in a half-duplex configuration. In this example, the system 100 transmits a tone to a relay point, the tone indicating data is ready to communicate (802). The tone can have a predetermined power level, and can be received by the relay point and other user devices, where the other user devices are also transmitting similar tones. As the system 100 receives tones from other devices, the system 100 can determine which other devices produce interference above a threshold, and should not be paired to communicate in the same frequency channel as the system 100. The system 100 can then also transmit the list of interfering devices to the relay point, with or in addition to the original tone. In addition to the tone and the list of interfering devices, other data which the system 100 could transmit to the relay point include device capabilities, usage information, estimated frames remaining, and remaining battery life of the device.

After transmitting the tone to the relay point (802), the system 100 receives, from the relay point, a schedule indicating a pairing with a mobile device, where the mobile device was selected based on a minimal interference algorithm (804). Based on the algorithm, the mobile device selected produces the least interference compared to a plurality of other devices. The selected device can produce a reduced amount of interference, although not the least amount, when compared with other devices. The schedule can indicate not only the pairing of the system 100 with the mobile device, but also when transmissions will occur, the frequency channel of the transmission, and which pairs will be communicating simultaneously. Using the schedule, the system 100 communicates the data to the relay point in a frequency channel while the mobile device receives alternative data from the relay point in the same frequency channel (806). The communication continues until the end of a designated number of frames, or until interference from the mobile device reaches a threshold level. Should the interference from the mobile device reach the threshold level, the system 100 can pause communications until the end of a designated "round" of communications, at which point the system can repeat the method with a new mobile device sharing the frequency channel with the system 100. The round of communications can be determined by a period of time, by an amount of data transferred, and can be static or dynamic depending on specific circumstances.

In addition to pausing communications, the system 100 can transmit a tone or signal indicating that an impeding amount of interference has been detected. The relay can then pause, restart, or discontinue associated communications until the start of a next round or until a different mobile device is available for communicating with the system 100.

Embodiments within the scope of the present disclosure may also include computer-readable storage devices and tangible and/or non-transitory computer-readable storage media for carrying or having computer-executable instructions or data structures stored thereon. Such tangible computer-readable storage media can be any available media that can be accessed by a general purpose or special purpose computer, including the functional design of any special purpose processor as described above. By way of example, and not limitation, such tangible computer-readable media can include RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Other embodiments of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The various embodiments described above are provided by way of illustration only and should not be construed to limit the scope of the disclosure. For example, the principles herein apply equally to scheduling of half-duplex capable devices and full-duplex capable devices. Various modifications and changes may be made to the principles described herein without following the example embodiments and applications illustrated and described herein, and without departing from the spirit and scope of the disclosure. Claim language reciting "at least one of" a set indicates that one member of the set or multiple members of the set satisfy the claim.

We claim:

1. A method comprising:
receiving, within a time window, a respective tone from each of a plurality of devices, the respective tone indicating that each device in the plurality of devices is performing one of uploading data and downloading data;
receiving, from each of the plurality of devices, a list of interfering devices, wherein the list of interfering devices comprises devices determined by each respective device to produce interference above a threshold in the each respective device based on the respective tone;
pairing the plurality of devices into pairs of an uploading device and a downloading device, where the pairing is based on other device interference each device in the plurality of devices causes with remaining devices in the plurality of devices and the list of interfering devices received from each of the plurality of devices, to yield a list of paired devices;
communicating the list of paired devices to the plurality of devices; and
generating a schedule for full-duplex communications using the list of paired devices.

2. The method of claim 1, wherein the pairing of the plurality of devices is further based on throughput of a network comprising the plurality of devices.

3. The method of claim 1, wherein the plurality of devices are mobile devices.

4. The method of claim 1, further comprising, after pairing of the plurality of devices and prior to communicating the list of paired devices, communicating the list of paired devices to a base station communicating with the plurality of devices.

5. The method of claim 1, wherein each pair of the pairs comprises a first device that will transmit first data in a common communication channel while a second device receives second data in the common communication channel, wherein the common communication channel is used by all of the pairs for the full-duplex communications.

6. The method of claim 1, wherein the pairing of the plurality of devices is further based on one of location proximity of the plurality of devices, geographic features near the plurality of devices, movement of the plurality of devices, and estimated remaining frames at the plurality of devices.

7. A system comprising:
a processor; and
a computer-readable storage device having instructions stored which, when executed by the processor, cause the processor to perform operations comprising:
receiving, within a time window, a respective tone from each of a plurality of devices, the respective tone indicating that each device in the plurality of devices is performing one of uploading data and downloading data;
receiving, from each of the plurality of devices, a list of interfering devices, wherein the list of interfering devices comprises devices determined by each respective device to produce interference above a threshold in the each respective device based on the respective tone;
pairing the plurality of devices into pairs of an uploading device and a downloading device, where the pairing is based on other device interference each device in the plurality of devices causes with remaining devices in the plurality of devices and the list of interfering devices received from each of the plurality of devices, to yield a list of paired devices;
communicating the list of paired devices to the plurality of devices; and
generating a schedule for full-duplex communications using the list of paired devices.

8. The system of claim 7, wherein the pairing of the plurality of devices is further based on throughput of a network comprising the plurality of devices.

9. The system of claim 7, wherein the plurality of devices are mobile devices.

10. The system of claim 7, the computer-readable storage device having additional instructions stored which, when executed by the processor, result in operations comprising, after pairing of the plurality of devices and prior to communicating the list of paired devices, communicating the list of paired devices to a base station communicating with the plurality of devices.

11. The system of claim 7, wherein each pair of the pairs comprises a first device that will transmit first data in a common communication channel while a second device receives second data in the common communication channel, wherein the common communication channel is used by all of the pairs for the full-duplex communications.

12. The system of claim 7, wherein the pairing of the plurality of devices is further based on one of location proximity of the plurality of devices, geographic features near the plurality of devices, movement of the plurality of devices, and estimated remaining frames at the plurality of devices.

13. A computer-readable storage device having instructions stored which, when executed by a computing device, cause the computing device to perform operations comprising:
receiving, within a time window, a respective tone from each of a plurality of devices, the respective tone indicating that each device in the plurality of devices is performing one of uploading data and downloading data;
receiving, from each of the plurality of devices, a list of interfering devices, wherein the list of interfering devices comprises devices determined by each respective device to produce interference above a threshold in the each respective device based on the respective tone;
pairing the plurality of devices into pairs of an uploading device and a downloading device, where the pairing is based on other device interference each device in the plurality of devices causes with remaining devices in the plurality of devices and the list of interfering devices received from each of the plurality of devices, to yield a list of paired devices;
communicating the list of paired devices to the plurality of devices; and
generating a schedule for full-duplex communications using the list of paired devices.

14. The computer-readable storage device of claim 13, wherein the pairing of the plurality of devices is further based on throughput of a network comprising the plurality of devices.

15. The computer-readable storage device of claim 13, wherein the plurality of devices are mobile devices.

16. The computer-readable storage device of claim 13, having additional instructions stored which, when executed by the computing device, result in operations comprising, after pairing of the plurality of devices and prior to communicating the list of paired devices, communicating the list of paired devices to a base station communicating with the plurality of devices.

17. The computer-readable storage device of claim 13, wherein each pair of the pairs comprises a first device that will transmit first data in a common communication channel while a second device receives second data in the common communication channel, wherein the common communication channel is used by all of the pairs for the full-duplex communications.

* * * * *